US012079882B2

(12) United States Patent
Palummo

(10) Patent No.: US 12,079,882 B2
(45) Date of Patent: Sep. 3, 2024

(54) CONVERSION FROM SCHEMAS TO PAYROLL POLICIES

(71) Applicant: ADP, Inc., Roseland, NJ (US)

(72) Inventor: Gaetano Palummo, Milan (IT)

(73) Assignee: ADP, Inc., Roseland, NJ (US)

( * ) Notice: Subject to any disclaimer, the term of this patent is extended or adjusted under 35 U.S.C. 154(b) by 116 days.

(21) Appl. No.: 17/108,610

(22) Filed: Dec. 1, 2020

(65) Prior Publication Data

US 2022/0172302 A1 Jun. 2, 2022

(51) Int. Cl.
*G06Q 40/00* (2023.01)
*G06F 16/21* (2019.01)
*G06F 16/958* (2019.01)
*G06F 40/40* (2020.01)
*G06Q 10/06* (2023.01)
*G06Q 10/0637* (2023.01)
*G06Q 10/10* (2023.01)
*G06Q 10/101* (2023.01)
*G06Q 10/1053* (2023.01)
*G06Q 40/12* (2023.01)

(52) U.S. Cl.
CPC ......... *G06Q 40/125* (2013.12); *G06F 16/212* (2019.01); *G06F 16/972* (2019.01); *G06F 40/40* (2020.01); *G06Q 10/0637* (2013.01); *G06Q 10/101* (2013.01); *G06Q 10/1053* (2013.01)

(58) Field of Classification Search
CPC ............ G06Q 40/125; G06Q 10/0637; G06Q 10/101; G06Q 10/1053; G06F 16/212; G06F 16/972; G06F 40/40
See application file for complete search history.

(56) References Cited

U.S. PATENT DOCUMENTS

| | | | |
|---|---|---|---|
| 2006/0020545 A1* | 1/2006 | Lindheimer | G06Q 40/02 705/40 |
| 2006/0293934 A1 | 12/2006 | Tsyganskiy et al. | |
| 2006/0294158 A1* | 12/2006 | Tsyganskiy | G06F 8/72 |
| 2009/0282089 A1 | 11/2009 | Lakshmanachar et al. | |
| 2017/0186099 A1* | 6/2017 | Lubczynski | G06Q 40/123 |
| 2019/0080418 A1* | 3/2019 | Van den Heever | G06Q 40/12 |
| 2020/0311048 A1 | 10/2020 | Pasini et al. | |
| 2021/0303595 A1* | 9/2021 | Sundar | G06F 16/972 |

OTHER PUBLICATIONS

International Preliminary Report on Patentability issued in corresponding International Application No. PCT/US2021/072489, dated Jun. 15, 2023 (8 pages).
International Search Report and Written Opinion issued in corresponding International Application No. PCT/US2021/072489, dated Feb. 28, 2022 (10 pages).

* cited by examiner

*Primary Examiner* — Hosain T Alam
*Assistant Examiner* — Chongsuh Park
(74) *Attorney, Agent, or Firm* — Foley & Lardner LLP

(57) ABSTRACT

A method, system, and computer program product are provided for generating an external payroll policy for a payroll system. A legacy schema is identified for execution by a legacy payroll system. A set of functions and rules is identified within a processing flow of the legacy schema. The external payroll policy is generated in a selected format type, according to a processing flow of the functions and rules that were identified within the legacy schema.

12 Claims, 12 Drawing Sheets

Formatting Schemas and Cycles & Converting them to External Policy

Schema  1000 — 610
Schemas to be exploded  ✖ ****  SCHEMA

☑ Expand calculation rules
☑ Expand subordinate PC rules
  calc. rules to be expanded                to
EE Subgroup Grouping for PCR
Language  EN        to
Program Class  C     to Convert Schema to Policy
☐ Rule as tree
☑ Generate Policy
Policy Type  SDO — 612
              SELECTION
              CONTROL
◉ File to Local PC
○ File to Application Server Local PC's File Name  C:\USERS\GPALUMM\DOCUMENTS\SOLUZIONI\CSAS_ID_
Application Server's File Name  /interfaces/TD3/GVE002/get

Dictionary: Display Table

Transparent Table: ZTADP_M99_SCHPOL    Active

Short Description: Schema To Policy Conversion Rules

| Field | Key Initi... | Data Element | Data Type | Length | Decimal... | Short Description |
|---|---|---|---|---|---|---|
| MANDT | ✓ | MANDT | CLNT | 3 | 0 | Client |
| POLTY | ✓ | ZADP_M99_POLICY... | CHAR | 5 | 0 | Policy Type |
| PROCL | ✓ | PROCL | CHAR | 1 | 0 | Program class |
| OTYPE | ✓ | OBTYP | CHAR | 2 | 0 | Object Type |
| FUNCO | ✓ | FUNCO | CHAR | 5 | 0 | Function name |
| PARNO | ✓ | PARNO | NUMC | 1 | 0 | Number of the function parameter |
| OPFLD | ✓ | OPFLD | CHAR | 5 | 0 | Field parameter |
| SEQNO |  | ZADP_M99_SEQNO | NUMC | 4 | 0 | Sequence Number |
| PAVAL |  | PARWE | CHAR | 4 | 0 | Valid parameter value |
| REFSQ |  | ZADP_M99_SEQNO | NUMC | 4 | 0 | Sequence Number |
| CONTY |  | ZADP_M99_POLICY... | NUMC | 2 | 0 | Policy - Content Type |
| CONTE |  | ZADP_M99_POLICY... | CHAR | 255 | 0 | Policy - Content |
| OPVAL |  | ZADP_M99_RULE_OP... | CHAR | 9 | 0 | Rule - Operator and Operand |

700

710

Change View "Schema To Policy - Conversion Rules": Overview

Schema To Policy - Conversion Rules

| Pol... | Prog.class | Func Typ | Function ... | Par No | Operat | Seq N... | Parameter value | Operat/nd | Ref Number |
|---|---|---|---|---|---|---|---|---|---|
| P_ | Payro... | Funct... | P0014 | Fourt... | | 5 | **** | | |
| P_ | Payro... | Funct... | P0014 | Fourt... | | 16 | D | | 7 |
| P_ | Payro... | Funct... | P0015 | First... | | 0 | I | | |
| P_ | Payro... | Funct... | P0015 | First... | | 1 | **** | | |
| P_ | Payro... | Funct... | P0015 | First... | | 2 | **** | | |
| P_ | Payro... | Funct... | P0015 | First... | | 6 | **** | | |
| P_ | Payro... | Funct... | P0015 | First... | | 7 | **** | | 1 |
| P_ | Payro... | Funct... | P0015 | First... | | 8 | ++++ | | 2 |
| P_ | Payro... | Funct... | P0015 | First... | | 9 | ++++ | | 8 |
| P_ | Payro... | Funct... | P0015 | First... | | 10 | ++++ | | 7 |
| P_ | Payro... | Funct... | P0015 | Secon... | | 3 | **** | | |

FIG. 8

*Change View "Schema To Policy - Conversion Rules": Overview*

910

Schema To Policy - Conversion Rules

| Pol... | Prog.class | Func Typ | Function... | Par No | Operat | Seq N... | Policy Content |
|---|---|---|---|---|---|---|---|
| P_ | Payro... | Funct... | P0014 | Fourt... | | 5 | Parameter4="$Pa4" |
| P_ | Payro... | Funct... | P0014 | Fourt... | | 16 | DayProcessing="Yes" |
| P_ | Payro... | Funct... | P0015 | First... | | 0 | ImportFurtherPaymentsAndDeductionsFromEmployeeD |
| P_ | Payro... | Funct... | P0015 | First... | | 1 | FunctionName="$Fun" |
| P_ | Payro... | Funct... | P0015 | First... | | 2 | Parameter1="$Pa1" |
| P_ | Payro... | Funct... | P0015 | First... | | 6 | Description="$Des" |
| P_ | Payro... | Funct... | P0015 | First... | | 7 | ForEachImportedPaymentDeduction |
| P_ | Payro... | Funct... | P0015 | First... | | 8 | ExecuteRule |
| P_ | Payro... | Funct... | P0015 | First... | | 9 | RuleName="$Pa1" |
| P_ | Payro... | Funct... | P0015 | First... | | 10 | ProcessingRule="$Pa1" |
| P_ | Payro... | Funct... | P0015 | Secon... | | 3 | Parameter2="$Pa2" |

FIG. 9

CONVERSION FROM SCHEMAS TO PAYROLL POLICIES

BACKGROUND

1. Field

The disclosure relates generally to an improved computer system and more specifically to a method, apparatus, computer system, and program product for providing payroll services. In particular, the disclosure relates to converting legacy schemas from a legacy system to external policies for implementation in a payroll processing system.

2. Description of the Related Art

Information systems are used for many different purposes. For example, an information system may be used by a human resources department to maintain benefits and other records about employees. For example, the human resources department may manage health insurance, wellness plans, and other programs in an organization using the information system.

As another example, the information system may be used to run a payroll to generate paychecks for the employees in the organization. The information system in the form of a payroll processing system performs functions, such as calculating salary payments, bonuses, deductions, withholdings, taxes, and other suitable functions involved with running the payroll for the organization.

Different departments in the organization may have responsibilities that impact payroll processing. For example, a benefits department in the organization may have a retirement benefits policy that is used to manage retirement benefits. This department may manage eligibility, vesting schedules, withholdings, and other items relating to the retirement benefits.

As another example, the human resources department may have a policy for uniform benefits. The human resources department may identify which employees may be eligible to receive a uniform allowance for dress codes for a particular position. The policy may define who is eligible for a uniform allowance, how claims are submitted, and how credits may be obtained.

Different policies in the different departments result in reimbursements, deductions, bonuses, and other items that are taken into account when processing the payroll. The payroll impact may be an effect on the employee's net pay, tax applicable earnings, payments to third parties, and submissions to authorities. Each of these different departments may have information systems that generate deductions, reimbursements, withholdings, or other items that are used in running the payroll.

Configuring an information system to implement the policy in the organization is complex and time-consuming. For example, for organizations having different geographic locations, the policies for running the payroll may be dependent on laws for a particular geographic location, such as a city, a state, or a country. With this situation, different legacy systems for the payroll are often used for the different geographic locations.

Transitioning from disparate legacy systems to a new payroll system necessitates identifying each of these policies as well as the conditions under which each of the policies are applicable to different employees. This on-boarding process often involves utilizing a consultant to meticulously identify and implement the complexities of these policies. The consultant works with people in the organization to identify the policies relating to the payroll and implement those policies in one or more information systems by writing code, setting parameters, or performing other operations in the information system.

Therefore, it would be desirable to have a method and apparatus that take into account at least some of the issues discussed above, as well as other possible issues. For example, it would be desirable to have a method and apparatus that overcome a technical problem with the complexity of configuring an information system to implement a business policy in an organization.

SUMMARY

According to one embodiment of the present invention, a method is provided for generating a payroll policy for a payroll system. The method includes identifying a legacy schema for execution by a legacy payroll system. The method further includes expanding the legacy schema to identify a set of functions and rules within a context of the legacy schema. The method further includes transforming the set of functions and rules into the payroll policy according to the context of the legacy schema.

According to another embodiment of the present invention, a computer system comprises a display system, a graphical user interface displayed on the display system, a hardware processor, and a conversion framework in the computer system for generating a payroll policy for a payroll system. The conversion framework is configured to identify a legacy schema for execution by a legacy payroll system. The conversion framework is further configured to expand the legacy schema to identify a set of functions and rules within a context of the legacy schema. The conversion framework is further configured to transform the set of functions and rules into the payroll policy according to the context of the legacy schema.

According to yet another embodiment of the present invention, a computer program product for generating a payroll policy for a payroll system comprises a computer-readable-storage media and program code stored on the computer-readable storage media. The program code includes code for identifying a legacy schema for execution by a legacy payroll system. The program code further includes code for expanding the legacy schema to identify a set of functions and rules within a context of the legacy schema. The method further includes transforming the set of functions and rules into the payroll policy according to the context of the legacy schema.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is a first window of a graphical user interface shown according to an illustrative embodiment;

FIG. 7 is a second window of a graphical user interface shown according to an illustrative embodiment;

FIG. 8 is a third window of a graphical user interface shown according to an illustrative embodiment;

FIG. 9, a third window of a graphical user interface including policy content is shown according to an illustrative embodiment;

DETAILED DESCRIPTION

Figure 1:
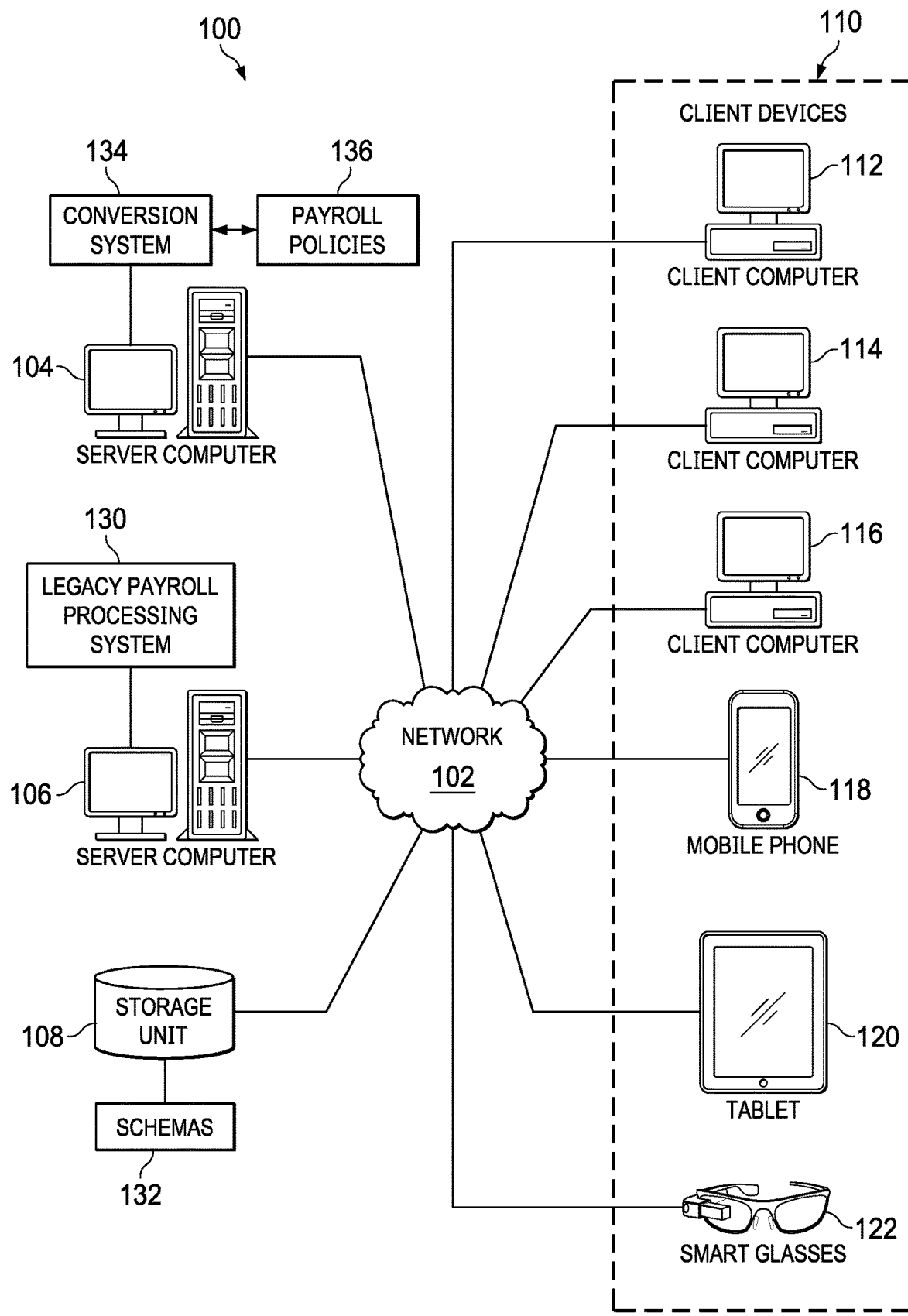
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, legacy payroll processing system 130 runs on server computer 106 in network data processing system 100. Legacy payroll processing system 130 process payroll using one or more schemas 132. In one illustrative example, legacy payroll processing system 130 is a system that processes payroll using software such as SAP ERP, or a software module such as SAP HR, both available from SAP SE.

An organization, may wish to transition to a new payroll processing system that does not utilize schemas 132 for implementing payroll policies. In this illustrative example, conversion system 134 runs on server computer 104. Server computer 104 generates payroll policies 136 based from schemas 132.

Figure 2:
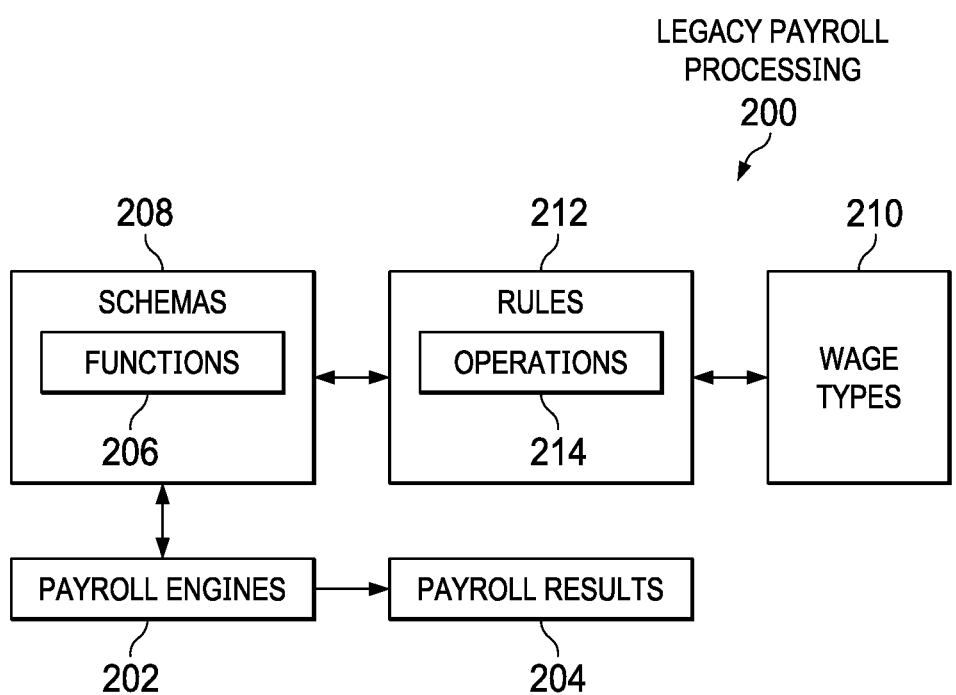
FIG. 2 is a block diagram of legacy payroll processing depicted according to an illustrative embodiment.

Referring now to FIG. 2, a block diagram of legacy payroll processing is depicted according to an illustrative example. Legacy payroll processing 200 can be implemented in a legacy payroll processing system, such as legacy payroll processing system 130 of FIG. 1. As per FIG. 2, operations 214 make rules 212, which in turn are attached to functions 206. Those functions 206 are embedded in schemas 208 (or sub-schemas inside a main schema) that dictate the flow of legacy payroll processing 200.

Payroll engines 202 calculate payroll results 204. In this example, payroll engines 202 may include one or more payroll engine. Each of payroll engines 202 can be different, but share a common core of functionality. Specifically, payroll engines 202 process functions 206 as specified schemas 208. Legacy payroll processing 200 may use one or more payroll engines 202 based on one or more parameters. For example, legacy payroll processing 200 may use a different one of payroll engines 202 for calculating payroll results 204 for different countries or geographic locations.

Each of schemas 208 is a collection of functions 206 executed in a specific order by payroll engines 202, with each function passing its results on to the next function in the sequence. Schemas 208 can be stored as a collection of rows in one or more tables, with the payroll engines 202 reading lines from the table and executing the functions one by one.

Schemas 208 consist of one or more functions 206. Functions 206 provide the high-level logic for payroll calculations. For example, functions 206 perform general processing—such as calculating payroll taxes on a given set of wages, reading wage types 210, calculating benefits premiums, and storing the results of the payroll calculation. Legacy payroll processing 200 can include a multitude of functions for processing payroll, some of which can be country-specific for a particular payroll engine. Functions 206 are executed within a particular context defined by an associated one of schemas 208 and payroll engines 202.

Functions 206 consist of one or more rules 212. Rules 212 contain the most basic logic used in legacy payroll processing 200. Where each of schemas 208 are a collection of one or more functions 206, each of rules 212 is a collection of one or more operations 214. Each of operations 214 is a basic piece of logic that is used in legacy payroll processing system 130, for example, to manipulate wage types 210.

Wage types 210 holds pieces of data, for example a rate, number, and/or amount, that are used in legacy payroll processing 200 to generate payroll results 204. Each of wage types 210 is associated with a set of attributes that control how payroll engines 202 manipulate and process the data.

When legacy payroll processing 200 is applied to provide a global payroll solution, the logic that underlies the payroll policies of a particular organization is overwhelmingly complex. Each of schemas 208 can trigger execution of rules 212 and other schemas 208. Each of rules 212 can trigger execution of other rules 212. Each of schemas 208 can employ a mix of different functions 206 and operations 214. Furthermore, each of payroll engines 202 may use one or more different schemas 208 (or sub-schemas inside a main schema). For a global payroll solution, this complexity can yield over 3 billion valid combinations between functions 206 with their associated function parameters, and operations 214 with their associated operators and operands.

Figure 3:
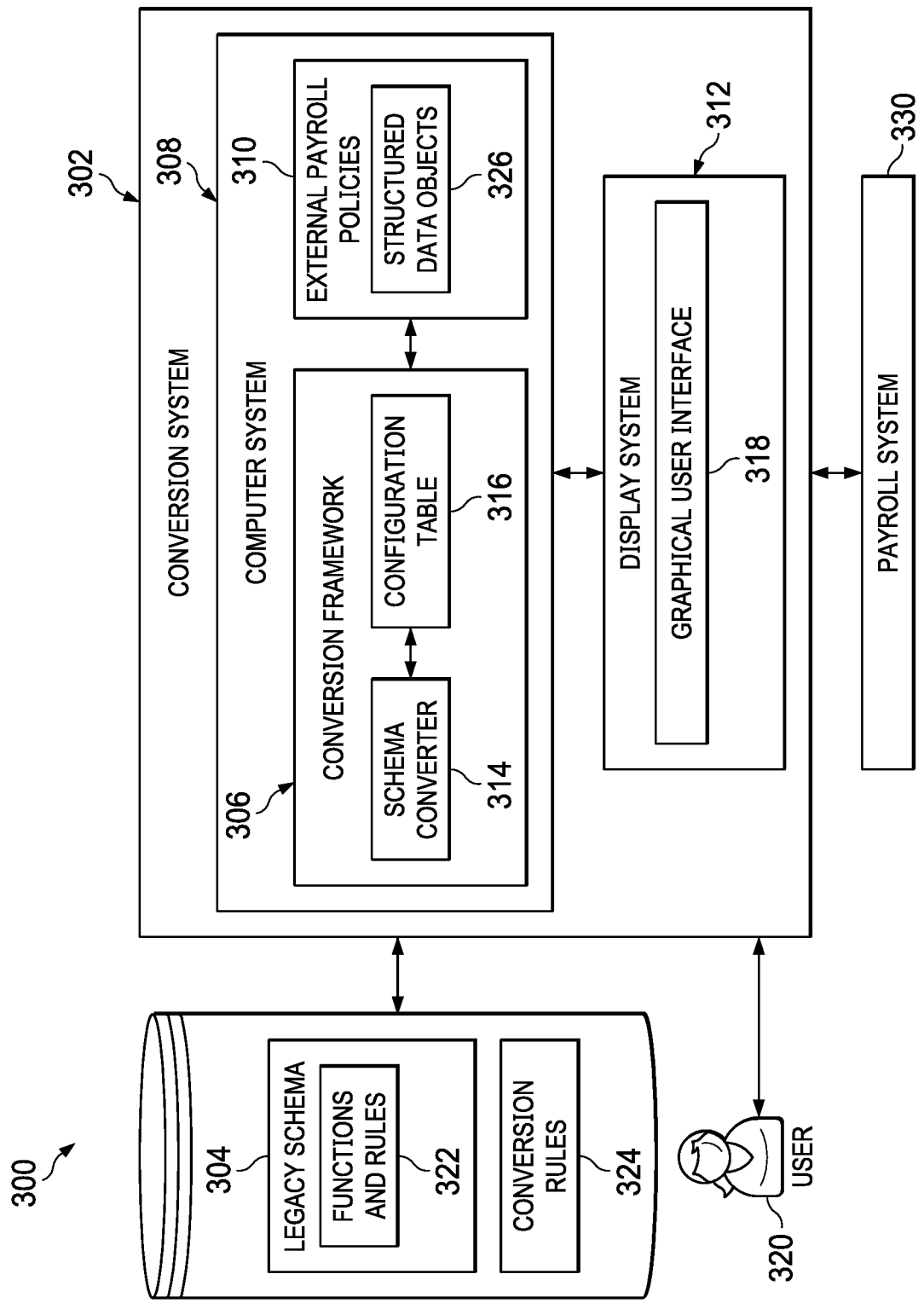
FIG. 3 is a block diagram of a payroll conversion environment depicted in accordance with an illustrative embodiment.

With reference now to FIG. 3, a block diagram of a payroll conversion environment is depicted in accordance with an illustrative embodiment. In this illustrative example, payroll conversion environment 300 includes components that can be implemented in hardware such as the hardware shown in network data processing system 100 in FIG. 1.

In payroll conversion environment 300, a method for generating a payroll policy for a payroll system can be performed using conversion system 302. In this illustrative example, the method for generating a payroll policy can be performed for legacy schemas 304 using conversion framework 306 running on computer system 308. The method for generating a payroll policy can generate external payroll policies 310 for a payroll system that does not utilize legacy schemas 304 of a legacy payroll processing system, such as legacy payroll processing system 130 of FIG. 1. In the illustrative example, this method for generating a payroll policy can generate external payroll policies 310 that can be used by a payroll system development team as specifications for building policies in payroll system 330, when payroll system 330 does not natively execute legacy schemas 304. Additionally, this method for generating a payroll policy can generate external payroll policies 310 that can be directly accepted by the payroll system 330.

In this illustrative example, conversion system 302 includes a number of different components. As depicted, conversion system 302 comprises computer system 308, display system 312, and conversion framework 306 in computer system 308.

In the illustrative example, computer system 308 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, smart glasses, or some other suitable data processing system.

When more than one data processing system is present in computer system 308, a process or component can be located in one data processing system or distributed between multiple data processing systems in computer system 308.

As used herein, a "framework" is an abstraction in which software providing generic functionality can be selectively changed by additional user-written code, thus providing application-specific software. It provides a standard way to build and deploy applications and is a universal, reusable software environment that provides particular functionality as part of a larger software platform to facilitate development of software applications, products and solutions. Software frameworks may include support programs, compilers, code libraries, tool sets, and application programming interfaces (APIs) that bring together all the different components to enable development of a project or system. In this illustrative example, conversion framework 306 enables conversion system 302 to generate external payroll policies 310 from legacy schemas 304.

Conversion framework 306 can be implemented in software, hardware, firmware or a combination thereof. When software is used, the operations performed by conversion framework 306 can be implemented in program code configured to run on hardware, such as a processor unit. When firmware is used, the operations performed by conversion framework 306 can be implemented in program code and data and stored in persistent memory to run on a processor unit. When hardware is employed, the hardware may include circuits that operate to perform the operations in conversion framework 306.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In an illustrative example, conversion framework 306 in computer system 308 is configured to perform a number of different operations or steps. For example, conversion framework 306 identifies legacy schemas 304. Legacy schemas 304 is an example of schemas 132 for execution by legacy payroll processing system 130, both shown in block form in FIG. 1.

Conversion framework 306 can identify legacy schemas 304 in a number of different ways. For example, conversion framework 306 can receive user input via graphical user interface 318 that contains a selection of legacy schemas 304. User input can be generated by at least one of a human machine interface of an artificial intelligence system, an expert system, or some other suitable process. The human machine interface comprises an input system, such as graphical user interface 318, and display system 312 that enables user 320 to interact with conversion system 302.

Conversion framework 306 identifies a set of functions and rules 322 within a processing flow of the legacy schemas 304. A legacy payroll processing system, such as legacy payroll processing system 130 of FIG. 1, executes functions and rules 322 within legacy schemas 304 according to a processing flow. To ensure that functions and rules 322 respect a context of legacy schemas 304, conversion framework 306 uses schema converter 314 to process legacy schemas 304. In this illustrative example, schema converter 314 can provide a runtime-type environment for identifying functions and rules 322 within a processing flow of the legacy schemas 304, such that the identification of functions and rules 322 respects the execution context of legacy schemas 304.

As used herein, "design time" refers to the environment and tools used to create, administer, and configure content, systems, and services used in a computer system. The design-time environment includes wizards, editors, and configuration utilities for various services, and its users are administrators of the portal. The aim of design time is the creation of a smooth runtime environment in which all end users of the portal perform their daily tasks. Configuration time follows design time. As used herein, "configuration time" refers to a phase during which a collaborative process is configured for a specific system landscape, in which data is selected from a data repository and then configured in an integration directory and finally evaluated by an integration server at runtime. As used herein, "run time" refers to the environment in which users perform their daily tasks, according to the roles defined for them within the organization. The runtime environment may be browser-based, responding to events triggered by the user, who can navigate among business-related content for viewing and analysis. Runtime provides localization capabilities, defined by user locale parameters, as well as offering the user the ability to personalize portal appearance and the organization of information. The portal runtime environment is directly affected by the actions of administrators during design time.

In this illustrative example, conversion framework 306 generates the external payroll policy 310 in a selected format type. The format type selected may enable use of the external payroll policy 310 as a specification for policies in a new payroll system, enabling a payroll system development team to more quickly build and configure policies in the new system. Alternatively, the format type selected may enable external payroll policy 310 to be directly accepted and executed by the new payroll system.

Conversion framework 306 generates the external payroll policy 310 according to a processing flow of the functions and rules 322 that were identified within the legacy schemas 304. Therefore, the selected format type of the external payroll policy 310 respects the execution context of functions and rules 322 of legacy schemas 304. In an illustrative example, generating the external payroll policy 310 includes logging a sequence of calls to the functions and rules 322 according to the processing flow of the legacy schemas 304. For each call in the processing low, conversion framework 306 records the parameters passed to a corresponding function or rule that was called. The parameters can include, for example, wage types, operations, rules, functions, subschemas, and combinations thereof, all shown in block form in FIG. 2.

In an illustrative example, conversion framework 306 generates a set of conversion rules 324 for the sequence of calls. Conversion framework 306 generates configuration table 316 from the set of conversion rules 324. Configuration table 316 enables user 320 to configure the external payroll policy 310 and a mapping between the legacy schemas 304 and a selected format type for the external payroll policy 310.

In an illustrative example, conversion framework 306 generates a description for each call of the processing flow of the legacy schemas 304. A "plain language", also sometimes referred to as an "plain English" or "natural language", refers to a human language such as, for example, English, Russian, German, or Japanese, and is distinct from the typically artificial command or programming language with which one usually talks to a computer. Each of conversion rules 324 included in configuration table 316 associates the plain language description of a call with the parameters passed to the corresponding function or rule.

In an illustrative example, the selected format type is a domain-specific language comprised of structured data objects 326. Each of structured data objects 326 comprises a set of composable data nodes that are composed according to a domain-specific language.

In this illustrative example, conversion framework 306 generates the external payroll policy 310 by transforming the set of functions and rules 322 into a set of composable data nodes. Each of functions and rules 322 that was identified within the processing flow of the legacy schemas 304 corresponds to one or more nodes of the set of composable data nodes that make up structured data object 326. Using schema converter 314, conversion framework 306 composes the set of composable data nodes according to the domain-specific language for consumption by the new payroll system to form the structured data object 326 that implements the payroll policy embodied in the legacy schemas 304.

In this illustrative example, the new payroll system can interpret the structured data object 326 to implement the external payroll policy 310. The payroll system can then perform a payroll operation according to the external payroll policy 310.

In the illustrative examples, conversion framework 306 provides a method for generating a payroll policy on a single configuration table requiring less than 30,000 entries per Policy Type, out of the more than 3 billion valid combinations. Conversion framework 306 automatically provides a basic configuration for all functions and operations, enabling the generation of external payroll policies 310 having a selected format type that can be directly accepted by the new payroll system external payroll policies 310. Additionally, conversion framework 306 enables the generation of external payroll policies 310 having a selected format type that can be used by a payroll system development team as specifications for building policies in a new payroll system.

In one illustrative example, one or more technical solutions are present that overcome a technical problem with configuring payroll policies for a payroll processing system as a result, one or more technical solutions may provide a technical effect that generates payroll policies from legacy schemas 304 in a manner that enables quicker and more efficient generation of payroll policies that can be natively accepted by the new payroll system. Additionally, one or more technical solutions may provide a technical effect that generates payroll policies from legacy schemas 304 in a manner that enables a payroll system development team to more quickly and efficiently build policies in a new payroll system from the generation of external policies having a selected format type.

Computer system 308 can be configured to perform at least one of the steps, operations, or actions described in the different illustrative examples using software, hardware, firmware or a combination thereof. As a result, computer system 308 operates as a special purpose computer system in which conversion framework 306 in computer system 308 enables quicker and more efficient generation of payroll policies that can be natively accepted by a new payroll system. In particular, conversion framework 306 transforms computer system 308 into a special purpose computer system as compared to currently available general computer systems that do not have conversion framework 306.

In the illustrative example, the use of conversion framework 306 in computer system 308 integrates processes into a practical application for generating a payroll policy for a payroll system that increases the performance of computer system 308 In other words, conversion framework 306 in computer system 308 is directed to a practical application of processes integrated into conversion framework 306 in computer system 308 that generate a payroll policy. In this illustrative example, conversion framework 306 in computer system 308 identifies a legacy schema for execution by a legacy payroll system; expands the legacy schema to identify a set of functions and rules within a context of the legacy schema; and transforms the set of functions and rules into the payroll policy according to the context of the legacy schema.

These processes integrated into conversion framework 306 result in a quicker and more efficient generation of payroll policies that can be natively accepted by the new payroll system, as well as a quicker and more efficient build policies in a new payroll system from the generation of external policies having a selected format type. In this manner, conversion framework 306 in computer system 308 provides a practical application of generating a payroll policy such that the functioning of computer system 308 is improved.

The illustration of conversion framework 306 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
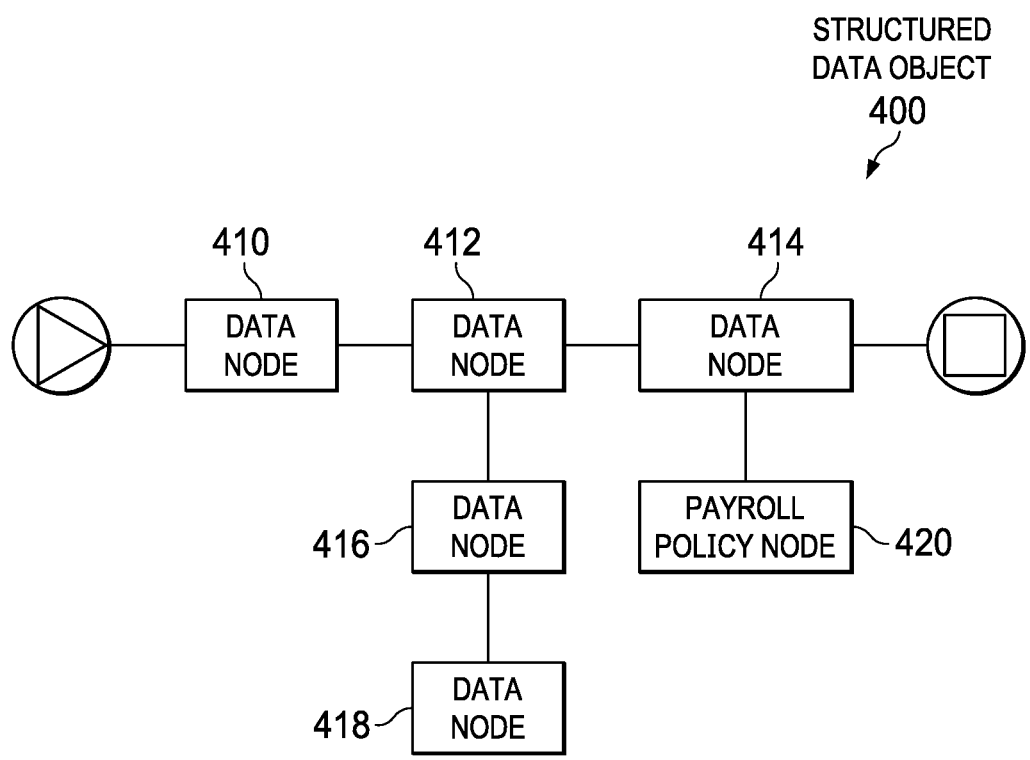
FIG. 4 is an illustration of a block diagram of a structured data object depicted in accordance with an illustrative embodiment.

With reference next to FIG. 4, an illustration of a block diagram of a structured data object is depicted in accordance with an illustrative embodiment. Structured data object 400 is an example of a selected format type for a payroll policy generated by conversion framework 306 of FIG. 3. As depicted, Structured data object 400 is a composition of well-defined data nodes that can be linked together according to a domain-specific language to create rules, mini-apps, collections, or bundles in a user-perceived codeless development environment, such as application development system 500 of FIG. 5.

Structured data object 400 includes data nodes 410, 412, and 414. Data nodes 410, 412, and 414 are well-defined structured data objects that can be manipulated within data and metadata binding module 506 of FIG. 5 to create desired payroll rules. Tile renderer module 504 of user interface engine 502 may visually present data nodes 410, 412, and 414, enabling the user to build different rules, mini-apps and apps in application development system 500 of FIG. 5. Each of data nodes 410, 412, and 414 correlates to one or more functions, which in turn can be interpreted by node interpreter 514 of FIG. 5 for implementing the corresponding payroll rule. The different permutations of the compositions of these functions, as well as differentiated input, enable the execution of the different payroll rule behaviors at runtime.

The functions of data nodes 410, 412, and 414 operate inside of a context defined at the beginning of the rule execution step, which is the target object for all symbols defined in the course of the rule execution, as well as for all input to and output from the rule itself. In this manner, data nodes 410, 412, and 414 act as a configuration object to the code being executed, defining an execution context (or scope being executed against) to other joined data nodes.

For example, structured data object 400 further includes data node 416. Data node 416 provides additional context for execution of related data node 412. Specifically, data node 416 may indicate that data node 412, as well as child data nodes thereof, should be interpreted within the context of data node 416.

Structured data object 400 further includes data node 418. Data node 418 provides additional context for execution of both related data node 412 and data node 416. For example, data node 418 may indicate that information required for execution of data node 412 should be requested and received from one or more web services. Data node 418 requests and returns the same context updated with the information received through the web services.

Structured data object 400 further includes payroll policy node 420. Payroll policy node 420 provides additional context for execution of related data node 414. Specifically, payroll policy node 420 may indicate a consuming service for receipt of payroll rule output provided by related data node 414. Payroll policy node 420 requests and returns information to a consuming service, such as a web page or payroll processing system.

Figure 5:
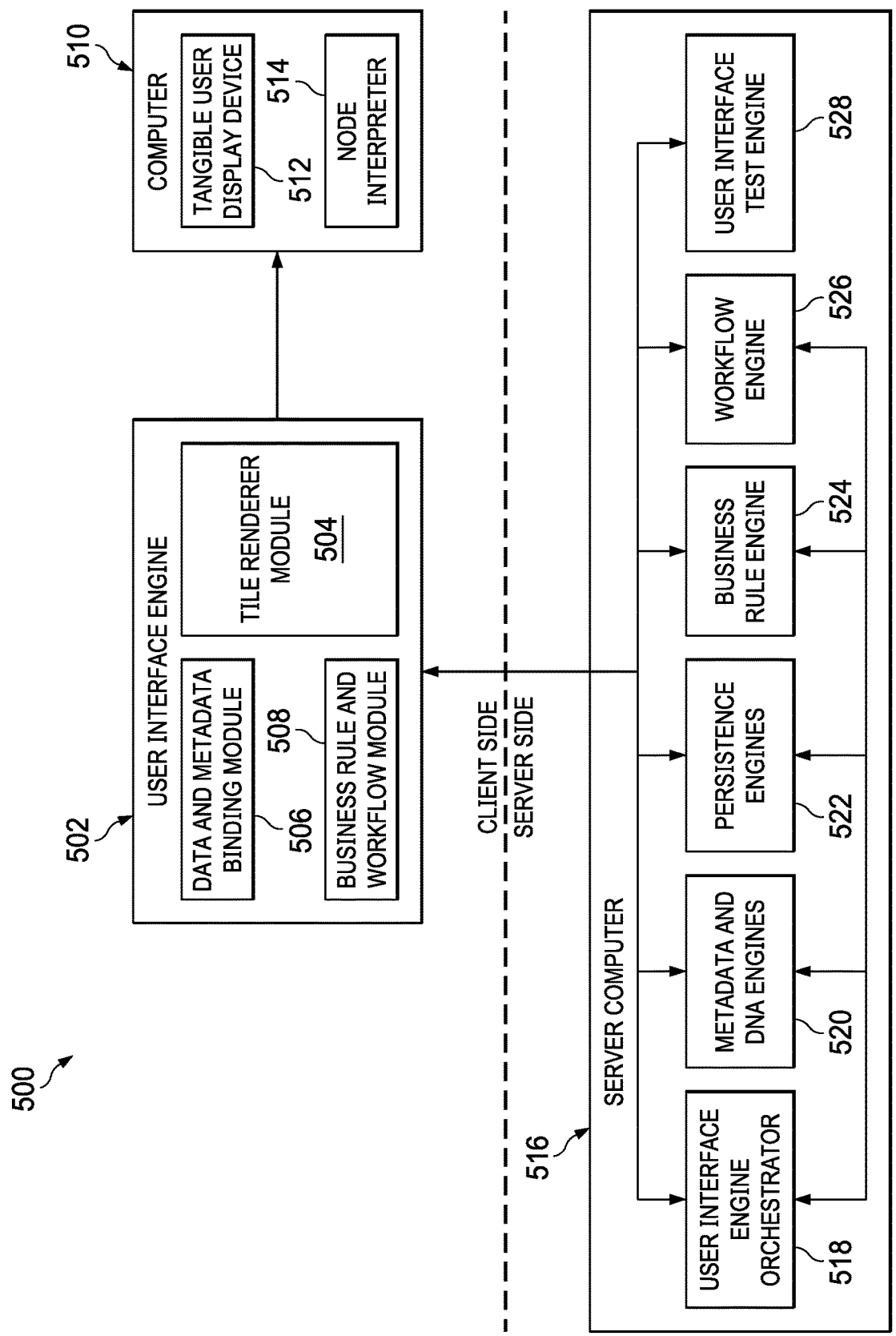
FIG. 5 is a block diagram illustrating an application development system depicted in accordance with an illustrative embodiment.

FIG. 5 is a block diagram illustrating an application development system depicted in accordance with an illustrative embodiment. Application development system 500 may be used to manipulate composable data nodes to build at least one of rules, mini-apps, and apps from structured data objects composed of well-defined data nodes, such as structured data object 400 of FIG. 4.

User interface engine 502 is computer code, underlying data and structured data objects which provide underlying functionality and implementation capability for application designers using application development system 500. Primarily, user interface engine 502 operates client-side, meaning that user interface engine 502 operates on a specific client user's computer, such as one or more of client computer 112, client computer 114, and client computer 116 of FIG. 1. In one illustrative example, user interface engine 502 could be a web browser or an extension to a web browser.

Underlying the user interface, user interface engine 502 may include one or more modules. As depicted, user interface engine 502 includes tile renderer module 504, data and metadata binding module 506, and business rule and workflow module 508. Each module may be considered a collection of software or computer code which implements the functionality of the module.

Tile renderer module 504 is computer code which computer 510 may use to render tiles on tangible user display device 512. Tile renderer module 504 may receive input from the user, from data and metadata binding module 506, and from business rule and workflow module 508 to change and manipulate both the functionality of computer 510, which is used to execute tile renderer module 504, as well as tangible user display device 512, which is used to display rendered tiles.

Data and metadata binding module 506 is computer code which computer 510 may use to bind data and structured data objects to the user interface, possibly a browser, so that user interface engine 502 may keep track of all of the data and structured data objects used in executing business rules and workflows, as well as rendering tiles. Additional details regarding the functionality of data and metadata binding module 506 is described below with respect to how data and structured data objects are used in user interface engine 502.

Business rule and workflow module 508 is computer code which computer 510 may use to create, join, merge, or otherwise manipulate composable data nodes in order to create mini-apps, collections, and bundles. Business rule and workflow module 508 is the underlying code which allows a user to create mini-apps, collections, and bundles without the user having to code any of the software being developed. Using data and structured data objects tracked by data and metadata binding module 506, the user can manipulate tiles rendered by tile renderer module 504. Business rule and workflow module 508 uses these composable data nodes, together with work flows and business rules to create the mini-apps, collections, or bundles in a user-perceived codeless development environment.

Node interpreter 514 is hardware or software which is used to interpret or execute business rules in a business system. Node interpreter 514 can be software residing in a web browser on computer 510. However, the illustrative embodiments are not necessarily limited to only client computers or web browsers.

Node interpreter 514 is a code interpreter designed for a domain-specific language entirely composed of structured data objects. In one illustrative example, node interpreter 514 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, node interpreter 514 executes the composition of structured data objects without compilation. Data node constructs are composed into well-defined structured data objects according to selected block types and properties, replacing the tokenization and parsing that would otherwise occur during compilation.

In some illustrative embodiments, user interface engine 502 may take advantage of some server-side services operating on one or more server computers, such as server computer 516. "Server-side" means that computer 510 communicates with server computer 516, possibly over a network such as the Internet. Server-side resources are provided to support user interface engine 502. While not always necessary for implementation of user interface engine 502, server-side resources can enhance the functionality of user interface engine 502.

For example, the server-side resources may include user interface engine orchestrator 518. In some exemplary illustrative embodiments, user interface engine orchestrator 518 may be considered part of user interface engine 502 such that user interface engine 502 operates partially both on computer 510, but also on one or more server computers, such as server computer 516.

User interface engine orchestrator 518 may serve as a proxy to speed up processing of user interface engine 502. User interface engine orchestrator 518 may retrieve structured data objects and then identify whether data queries are for customer data, business rules, or any other structured data objects. User interface engine orchestrator 518 may then request such data, objects, or code, from the data center operating server-side. User interface engine orchestrator 518 may cache retrieved data, structured data objects, code, workflows, or objects to be sent back to user interface engine 502.

Server-side services may include other components other than user interface engine orchestrator 518. For example, server-side resources could include one or more metadata and DNA engines 520, which can be used to manage or provide structured data objects for use in user interface engine 502. Server-side resources may also include one or more persistence engines 522, which can be used to save work done using user interface engine 502. Server-side resources may also include business rule engine 524, which may be used to create or store business rules that are used by user interface engine 502 in the user-perceived codeless building of mini-apps, collections, and bundles.

Server-side resources may also include workflow engine 526, which may be used to create or store workflows that are used by user interface engine 502 in the user-perceived codeless building of mini-apps, collections, and bundles.

Server-side resources may also include user interface test engine 528, which may be used to test both the functionality of user interface engine 502, possibly as well as the mini-apps, collections, and bundles created using user interface engine 502.

With reference next to FIG. 6, a first window of a graphical user interface is shown according to an illustrative embodiment. Window 600 can be implemented as part of a graphical user interface for a conversion system, such as graphical user interface 318 of FIG. 3.

Window 600 includes schema selection control 610. Schema selection control 610 allows a user, such as user 320 of FIG. 3, to select a legacy schema for conversion to a payroll policy.

Window 600 includes policy type selection control 612. Policy type selection control 612 allows a user, such as user 320 of FIG. 3, to select a format for the payroll policy to be generated from the selected schema. As indicated, a policy type "XML" has been selected, indicating that the payroll policy should be generated to as an extensible markup language document. Other formats could also be selected, such as structured data object (SDO), or rich text format (RTF).

With reference next to FIG. 7, a second window of a graphical user interface is shown according to an illustrative embodiment. Window 700 can be implemented as part of a graphical user interface for a conversion system, such as graphical user interface 318 of FIG. 3.

Windows 700 depicts a list of rules 710. Rules 710 is a set of conversion rules that can be applied to generate generates a set of conversion rules for an external payroll policy, such conversion rules 324 of FIG. 3. A schema converter, such as schema converter 314 of FIG. 3, uses the various rules 710 to generate conversion rules for converting a legacy schema to an external payroll policy, according to a selected policy format.

With reference next to FIG. 8, a third window of a graphical user interface is shown according to an illustrative embodiment. Window 800 can be implemented as part of a graphical user interface for a conversion system, such as graphical user interface 318 of FIG. 3.

Windows 800 illustrates configuration table 810. Configuration table 810 is an example of configuration table 316 of FIG. 3. Configuration table 810 maps functions and rules of legacy schemas 304, such as functions and rules 322 of FIG. 3, to conversion rules, such as conversion rules 324 of FIG. 3. Mapping functions and rules to conversion rules as illustrated in configuration table 810 enables a user to selectively configure a schema converter, such as schema converter 314 of FIG. 3.

With reference next to FIG. 9, a third window of a graphical user interface including policy content is shown according to an illustrative embodiment. As depicted, configuration table 810 depicts policy content 910. Policy content 910 includes the converted functions and rules of the legacy schema, for example, based on an application of one or more of rules 710. When a structured data object policy type has been selected, policy content 910 includes a composition of data nodes that have been composed to generate a structured data object that implements the payroll policy.

Figure 10:
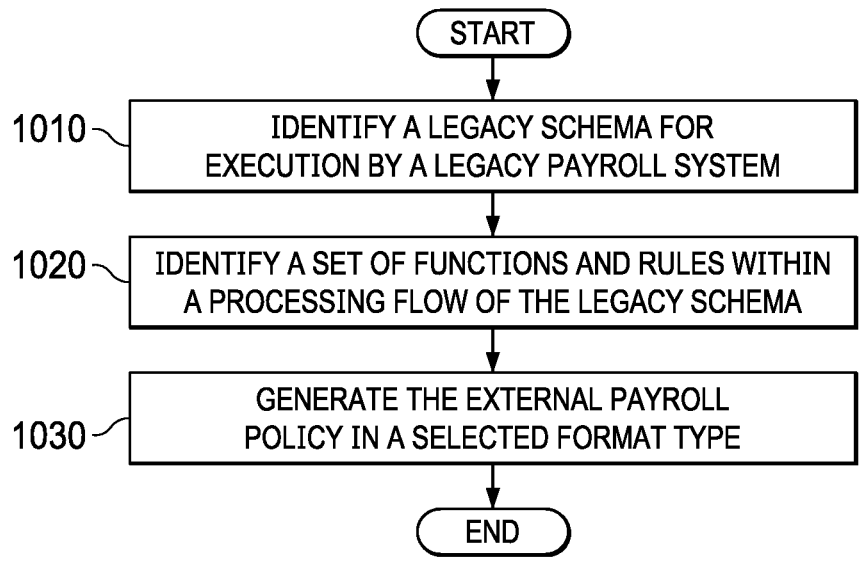
FIG. 10 is a flowchart of a process for generating a payroll policy depicted in accordance with an illustrative embodiment.

Turning next to FIG. 10, a flowchart of a process for generating a payroll policy is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in conversion framework 306 in computer system 308 in FIG. 3.

The process begins by identifying a legacy schema for execution by a legacy payroll system (step 1010). The process identifies a set of functions and rules within a processing flow of the legacy schema (step 1020). The process generates the external payroll policy in a selected format type (step 1030). The external payroll policy is generated according to the processing flow of the functions and rules that were identified within the legacy schema. The process terminates thereafter.

Figure 11:
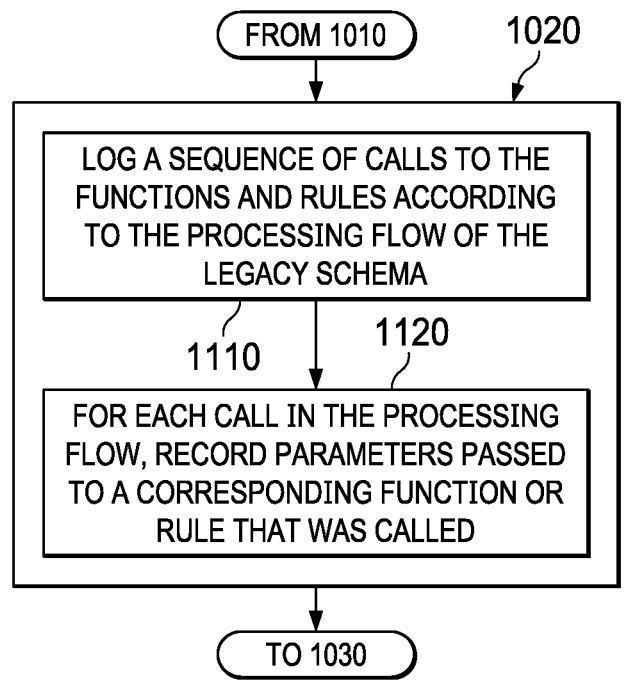
FIG. 11 is a flowchart of a process for transforming a set of functions and rules into a payroll policy depicted according to an illustrative example.

With reference next to FIG. 11, a flowchart of a process for identifying the set of functions and rules is depicted according to an illustrative example. The process in FIG. 11 can be implemented as one example of process step 1020 of FIG. 10.

Continuing from step 1010, the process logs a sequence of calls to the functions and rules according to the processing flow of the legacy schema (step 1110). The process records parameters passed to a corresponding function or rule for each call in the processing flow (step 1120), and terminates thereafter.

Figure 12:
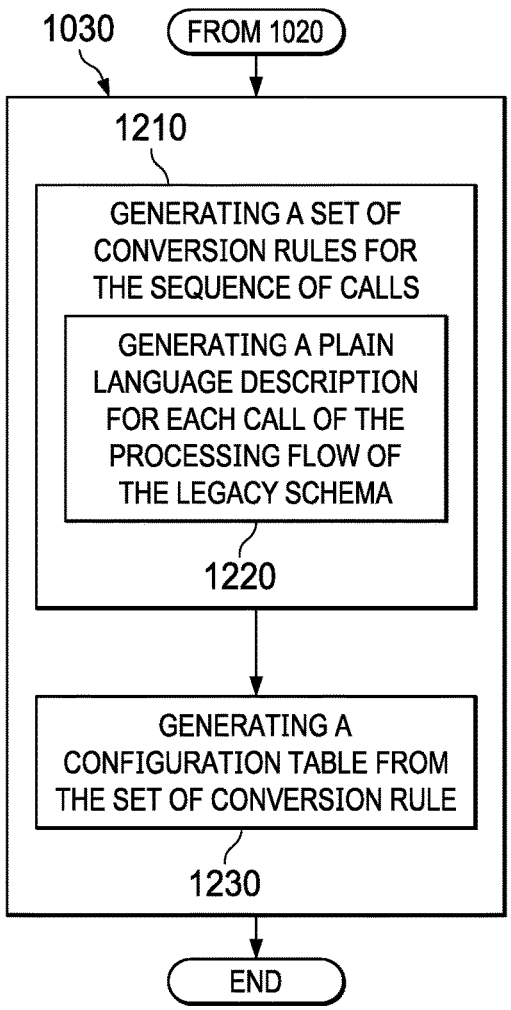
FIG. 12 is a flowchart of a process for transforming a set of functions and rules into a payroll policy depicted according to an illustrative example

Referring now to FIG. 12, a flowchart of a process for generating a payroll policy according to a selected policy format is depicted in accordance with an illustrative embodiment. The process of FIG. 12 can be implemented as one example of process step 1030 of FIG. 10.

Continuing from step 1020, the process generates a set of conversion rules for the sequence of calls (step 1210). In one illustrative example, generating the set of conversion rules can include generating a plain language description for each call of the processing flow of the legacy schema (step 1220). Each conversion rule associates the plain English description of a call with the parameters passed to the corresponding function or rule.

The process generates a configuration table from the set of conversion rules (step 1230), and terminates thereafter. The configuration table enables a user to configure the payroll policy and a mapping between the legacy schema and a selected format type for the payroll policy.

Figure 13:
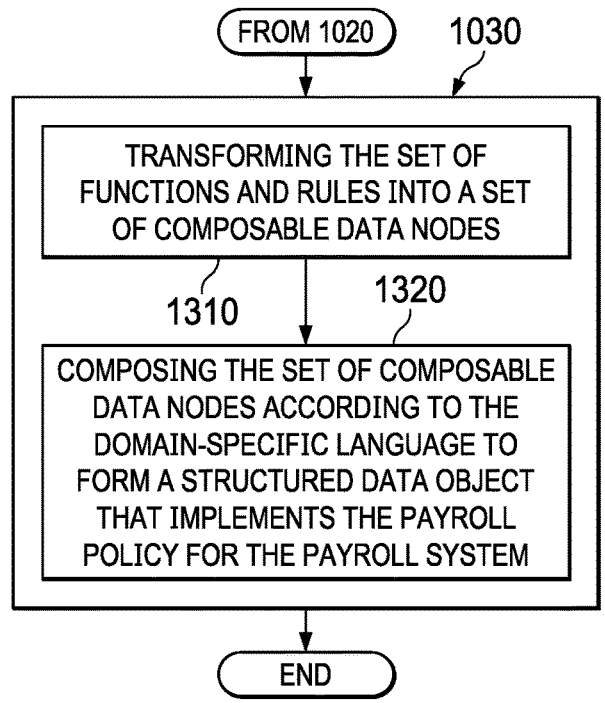
FIG. 13 is a flowchart of a process for generating a payroll policy according to a structured data object policy format depicted in accordance with an illustrative embodiment.

Referring now to FIG. 13, a flowchart of a process for generating a payroll policy according to a structured data object policy format is depicted in accordance with an illustrative embodiment. The process of FIG. 13 can be implemented as one example of process step 1030 of FIG. 10.

In this illustrative example, the selected format type is a structured data object for a domain-specific language. The structured data object comprises a set of composable data nodes that are composed according to the domain-specific language to form the structured data object. Continuing from step 1020, the process transforms the set of functions and rules into a set of composable data nodes (step 1310). Each function and rule that was identified within the processing flow of the legacy schema corresponds to one or more node of the set of composable data nodes.

The process composes the set of composable data nodes according to the domain-specific language to form the structured data object that implements the payroll policy for the payroll system (step 1320), and terminates thereafter.

Figure 14:
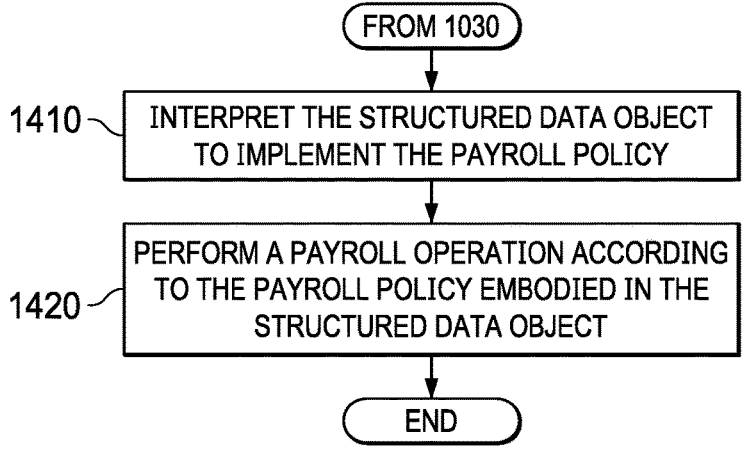
FIG. 14 is a flowchart of a process for performing a payroll operation depicted in accordance with an illustrative embodiment.

Referring now to FIG. 14, a flowchart of a process for performing a payroll operation is depicted in accordance with an illustrative embodiment. The process in FIG. 14 can be implemented in hardware, software, or both. When implemented in software, the process can take the form of program code that is run by one of more processor units located in one or more hardware devices in one or more computer systems. For example, the process can be implemented in payroll processing system that includes a node interpreter, such as node interpreter 514 of FIG. 5, that performs payroll operations by interpreting structured data objects, such as structured data object 400 of FIG. 4.

Continuing from step 1320, the process interprets the structured data object to implement the payroll policy (step 1410). The process then performs the payroll operation according to the payroll policy embodied in the structured data object (step 1420), and terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 15:
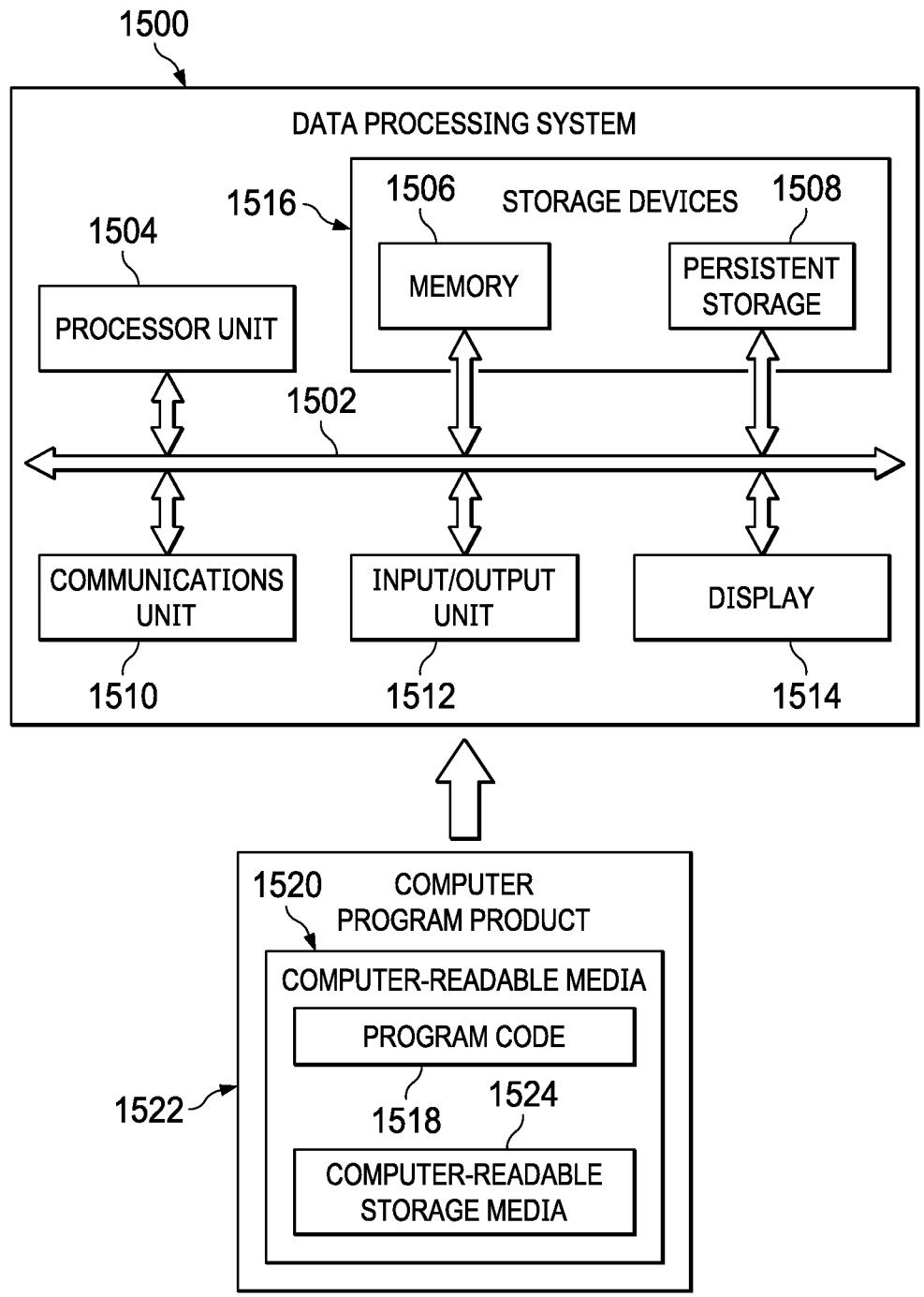
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement server computer 104, server computer 106, client devices 110, in FIG. 1. Data processing system 1500 can also be used to implement computer system 308 in FIG. 3, as well as computer 510 and server computer 516 in FIG. 5. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 is hardware and includes one or more processors. Processor unit 1504 can also be referred to has a hardware processor unit. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can may be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program code, computer usable program code, or computer-readable program code that can be read and executed by a processor in processor unit 1504. The program code in the different embodiments can be embodied on different physical or computer-readable storage media, such as memory 1506 or persistent storage 1508.

Program code 1518 is located in a functional form on computer-readable media 1520 that is selectively removable and can be loaded onto or transferred to data processing system 1500 for execution by processor unit 1504. Program code 1518 and computer-readable media 1520 form computer program product 1522 in these illustrative examples. In the illustrative example, computer-readable media 1520 is computer-readable storage media 1524.

In these illustrative examples, computer-readable storage media 1524 is a physical or tangible storage device used to store program code 1518 rather than a medium that propagates or transmits program code 1518. The term "non-transitory" or "tangible", as used herein, is a limitation of the medium itself (i.e., tangible, not a signal) as opposed to a limitation on data storage persistency (e.g., RAM vs. ROM). Computer-readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1518 can be transferred to data processing system 1500 using a computer-readable signal media. The computer-readable signal media can be, for example, a propagated data signal containing program code 1518. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1520" can be singular or plural. For example, program code 1518 can be located in computer-readable media 1520 in the form of a single storage device or system. In another example, program code 1518 can be located in computer-readable media 1520 that is distributed in multiple data processing systems. In other words, some instructions in program code 1518 can be located in one data processing system while other instructions in program code 1518 can be located in one data processing system. For example, a portion of program code 1518 can be located in computer-readable media 1520 in a server computer while another portion of program code 1518 can be located in computer-readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program code 1518.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for generating an external payroll policy for a payroll system, the method comprising:
   identifying, by a computer system, a legacy schema for execution by a legacy payroll system;
   executing, by the computer system, a conversion framework on a processing flow of the legacy schema to distinguish a sequence of calls comprising a plurality of inputs, the conversion framework comprising a schema converter component configured to process legacy schemas to generate external payroll policies;
   identifying, by the computer system responsive to the plurality of inputs distinguished via execution of the conversion framework, a set of functions and rules within the processing flow of the legacy schema;
   generating, by the computer system using the conversion framework, a natural language description for the plurality of inputs of the sequence of calls distinguished by execution of the conversion framework;
   generating, by the computer system based on the natural language description and the set of functions and rules generated by the conversion framework, a configuration table mapping the legacy schema to a selected format type;
   transforming, by the computer system, the set of functions and rules generated by the conversion framework within the processing flow of the legacy schema into a corresponding one or more nodes of a set of composable data nodes; and
   generating, by the computer system based on the configuration table, the external payroll policy via composition of the set of composable data nodes in accordance with the selected format type to form a structured data object that implements the external payroll policy for the payroll system.

2. The method of claim 1, wherein the selected format type is a domain-specific language comprised of structured data objects, wherein each structured data object comprises composable data nodes that are composed according to the domain-specific language to form the structured data object.

3. The method of claim 2, wherein generating, by the computer system, the external payroll policy further comprises
   transforming, by the computer system, the set of functions and rules generated by the conversion framework within the processing flow of the legacy schema into a set of composable data nodes, wherein each function and rule that was identified within the processing flow of the legacy schema corresponds to one or more node of the set of composable data nodes; and
   composing, by the computer system, the set of composable data nodes according to the domain-specific language to form a structure data object that implements the external payroll policy for the payroll system.

4. The method of claim 2, further comprising:
   interpreting, by the payroll system, the structured data object to implement the external payroll policy; and
   performing, by the payroll system a payroll operation according to the external payroll policy.

5. A computer system, comprising:
   a display system;
   a graphical user interface displayed on the display system;
   a hardware processor unit; and
   a conversion framework in the computer system comprising a schema converter component to process legacy schemas to generate external payroll policies for a payroll system, wherein the conversion framework is configured:
      to identify a legacy schema for execution by a legacy payroll system;
      to distinguish a sequence of calls comprising a plurality of inputs of a processing flow of the legacy schema;

to identify, responsive to the plurality of inputs distinguished, a set of functions and rules within the processing flow of the legacy schema;

to generate a natural language description for the plurality of inputs of the sequence of calls distinguished by execution of the conversion framework;

to generate, based on the natural language description and the set of functions and rules generated by the conversion framework, a configuration table mapping the legacy schema to a selected format type;

to transform the set of functions and rules generated by the conversion framework within the processing flow of the legacy schema into a corresponding one or more nodes of a set of composable data nodes; and to generate, based on the configuration table, an external payroll policy via composition of the set of composable data nodes in accordance with the selected format type to form a structured data object that implements the external payroll policy for the payroll system.

6. The computer system of claim 5, wherein the selected format type is a domain-specific language comprised of structured data objects, wherein each structured data object comprises composable data nodes that are composed according to the domain-specific language to form the structured data object.

7. The computer system of claim 6, wherein in generating the external payroll policy, the conversion framework is further configured:

to transform the set of functions and rules generated by the conversion framework within the processing flow of the legacy schema into a set of composable data nodes, wherein each function and rule that was identified within the processing flow of the legacy schema corresponds to one or more node of the set of composable data nodes; and to compose the set of composable data nodes according to the domain-specific language to form a structured data object that implements the external payroll policy for the payroll system.

8. The computer system of claim 6, further comprising:

interpreting, by a payroll system, the structured data object to implement the external payroll policy; and performing, by a payroll system, a payroll operation according to the external payroll policy.

9. A non-transitory computer program product for generating an external payroll policy for a payroll system, the computer program product comprising:

a computer-readable storage media;

program code, stored on the computer-readable storage media, for identifying a legacy schema for execution by a legacy payroll system;

program code, stored on the computer-readable storage media, for executing a conversion framework on a processing flow of the legacy schema to distinguish a sequence of calls comprising a plurality of inputs, the conversion framework comprising a schema converter component configured to process legacy schemas to generate external payroll policies;

program code, stored on the computer-readable storage media, for identifying, responsive to the plurality of inputs distinguished via execution of the conversion framework, a set of functions and rules within the processing flow of the legacy schema;

program code, stored on the computer-readable storage media, for generating, using the conversion framework, a natural language description for the plurality of inputs of the sequence of calls distinguished by execution of the conversion framework;

program code, stored on the computer-readable storage media, for generating, based on the natural language description and the set of functions and rules generated by the conversion framework, a configuration table mapping the legacy schema to a selected format type;

program code, stored on the computer-readable storage media, for transforming the set of functions and rules generated by the conversion framework within the processing flow of the legacy schema into a corresponding one or more nodes of a set of composable data nodes; and program code, stored on the computer-readable storage media, for generating, based on the configuration table, the external payroll policy via composition of the set of composable data nodes in accordance with the selected format type to form a structured data object that implements the external payroll policy for the payroll system.

10. The non-transitory computer program product of claim 9, wherein the selected format type is a domain-specific language comprised of structured data objects, wherein each structured data object comprises composable data nodes that are composed according to the domain-specific language to form the structured data object.

11. The non-transitory computer program product of claim 10, wherein the program code for generating the external payroll policy further comprises:

program code, stored on the computer-readable storage media, for transforming the set of functions and rules generated by the conversion framework within the processing flow of the legacy schema into a set of composable data nodes, wherein each function and rule that was identified within the processing flow of the legacy schema corresponds to one or more node of the set of composable data nodes; and program code, stored on the computer-readable storage media, for composing the set of composable data nodes according to the domain-specific language to form a structured data object that implements the external payroll policy for the payroll system.

12. The computer program product of claim 10, further comprising:

program code, stored on the computer-readable storage media, for interpreting the structured data object to implement the external payroll policy; and performing a payroll operation according to the external payroll policy.

* * * * *